United States Patent [19]

Ryan

[11] Patent Number: 4,577,216
[45] Date of Patent: Mar. 18, 1986

[54] METHOD AND APPARATUS FOR MODIFYING THE COLOR BURST TO PROHIBIT VIDEOTAPE RECORDING

[75] Inventor: John O. Ryan, Cupertino, Calif.

[73] Assignee: Macrovision, San Jose, Calif.

[21] Appl. No.: 551,696

[22] Filed: Nov. 14, 1983

[51] Int. Cl.⁴ .......................... H04N 9/45; H04N 9/80; H04N 7/167; H04N 5/78
[52] U.S. Cl. ..................................... 358/19; 358/319; 358/120; 360/37.1
[58] Field of Search ............... 358/118, 114, 120, 123, 358/124, 319, 16, 17, 19, 12, 20, 30; 360/37.1

[56] References Cited

U.S. PATENT DOCUMENTS

| | | | |
|---|---|---|---|
| 3,723,637 | 3/1973 | Fujio et al. | 358/12 |
| 3,963,865 | 6/1976 | Songer | 358/120 |
| 4,100,575 | 7/1978 | Morio et al. | 358/120 |
| 4,163,253 | 7/1979 | Morio et al. | 360/37.1 |
| 4,213,149 | 7/1980 | Janko | 358/319 X |
| 4,475,129 | 10/1984 | Kagota | 358/319 X |
| 4,488,183 | 12/1984 | Kinjo | 358/319 |

FOREIGN PATENT DOCUMENTS

| | | | |
|---|---|---|---|
| 0123289 | 7/1983 | Japan | 358/319 |
| 2042846 | 9/1980 | United Kingdom | 358/114 |

Primary Examiner—James J. Groody
Assistant Examiner—Michael P. Dunnam
Attorney, Agent, or Firm—Cushman, Darby & Cushman

[57] ABSTRACT

A method and apparatus which modifies a color video signal in such a manner that a conventional television receiver produces a normal color picture from the modified signal, whereas a videotape recording made from the modified signal exhibits annoying color interference. This is achieved by phase modulating the color burst component of the video signal with a noise signal. A videotape recorder interprets the phase variation as a velocity error and alters the chrominance signal, giving rise to color noise in the videotape recording. The characteristics of the noise signal are chosen to preclude interfering with the receiver's subcarrier regenerator.

14 Claims, 2 Drawing Figures

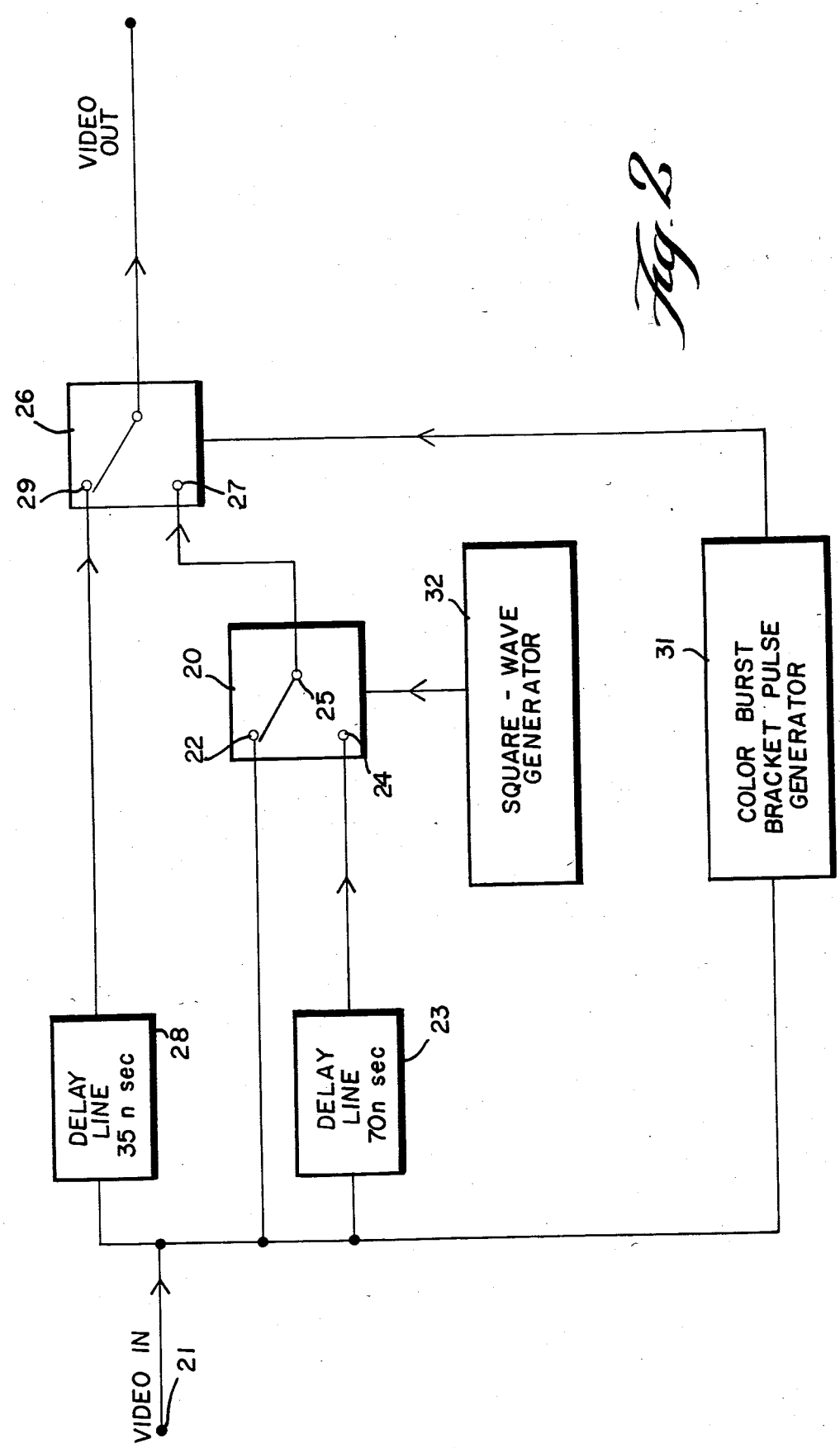

METHOD AND APPARATUS FOR MODIFYING THE COLOR BURST TO PROHIBIT VIDEOTAPE RECORDING

BACKGROUND OF THE INVENTION

This invention relates to a method and apparatus for processing a video signal. More particularly, this invention relates to an arrangement for modifying a color video signal in such a manner that a conventional television receiver produces a normal color picture from the modified signal, whereas a videotape recording made from the modified signal exhibits very annoying color interference.

In both the NTSC and PAL color television systems color information is transmitted on a subcarrier signal. In this case of the NTSC system the subcarrier has a frequency of about 3.58 MHz and in the case of the PAL system a frequency of about 4.43 MHz. In both systems the precise color at any point in the picture is determined by the phase of this subcarrier relative to some reference phase, while the degree of saturation of the color is determined by the amplitude of the subcarrier.

In order for a television receiver to correctly reproduce colors, the receiver requires information concerning the above-mentioned reference phase. This information is transmitted as part of the video signal in the form of a burst of about 9 cycles of subcarrier following the horizontal synchronizing pulse, and is referred to as a color burst. This color burst signal is used in the television receiver to phase-lock a crystal oscillator, thus generating a continuous subcarrier signal at the reference phase which is then used to demodulate the color information. It is normal for the phase-locked crystal oscillator in the television receiver to have a fairly long time constant, on the order of a few milliseconds. The long time constant insures that the oscillator will ignore short term phase perturbations of the color burst signal as might be caused by noise.

OBJECTS AND SUMMARY OF THE INVENTION

It is an object of this invention to provide a method and apparatus for modifying a color video signal so that a conventional television receiver produces a normal color picture from the modified signal, whereas a videotape recording made from the modified signal exhibits annoying color interference, thus discouraging or inhibiting videotaping of the signal.

It is a more specific object of this invention to provide such a method and apparatus in which the color burst component of the video signal is deliberately phase-modulated by a random or pseudo-random noise signal, or other suitable signal.

Briefly, in accordance with one embodiment of the invention, the color burst signal is phase modulated with a noise signal to produce a modified signal. The modified signal is such that the phase modulation is ignored by a television receiver. However, a color videotape recorder is responsive to the modified signal while replaying same to alter the phase of the chrominance signal, giving rise to severe color noise in a picture reproduced from the videotape recording.

BRIEF DESCRIPTION OF THE DRAWINGS

FIG. 2 is a block diagram of an alternate embodiment of a circuit in accordance with the present invention.

DESCRIPTION OF THE PREFERRED EMBODIMENTS

Figure 1:
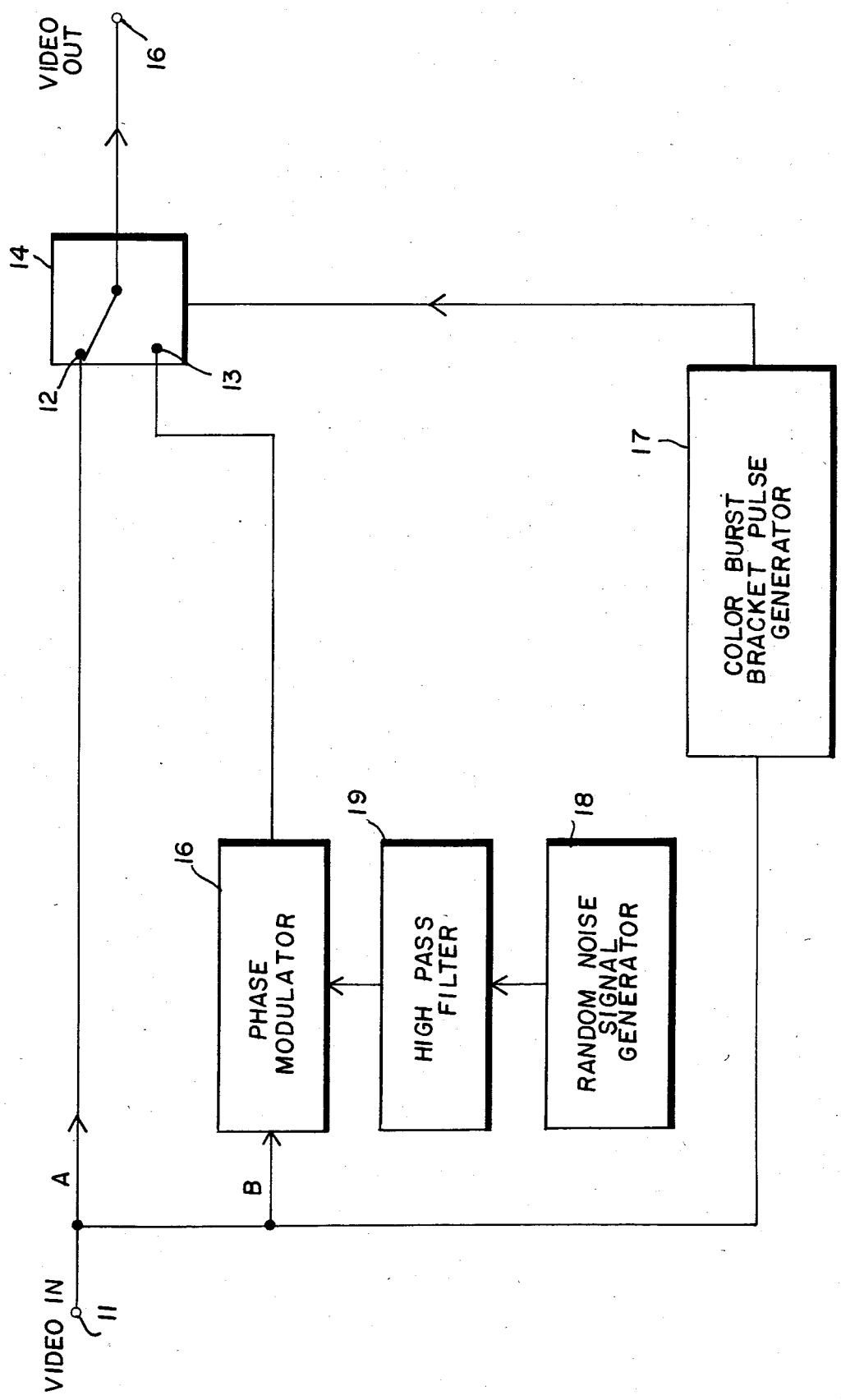
FIG. 1 is a block diagram of one embodiment of a circuit in accordance with the present invention for practicing the method of this invention.

It is common practice for color videotape recorders to utilize the color burst component of a video signal to generate velocity error-correction signals to compensate for the inevitable fluctuations of the head to tape velocity. The velocity error corrector circuit in a videotape recorder measures the phase of the color burst signal on a line-by-line basis. Any variation of phase is assumed to be due to head to tape velocity errors, and a correction signal is generated. The correction signal alters the phase of the chrominance signal in an attempt to eliminate these errors.

In accordance with the present invention, deliberate phase errors are introduced into the color burst signal. The velocity error correction circuit in a videotape recorder will accordingly attempt to eliminate the deliberate phase errors introduced. In so doing, the velocity error correction circuit will transfer the error from the color burst to the chrominance signal, thus giving rise to severe color noise in the viewed picture.

There are a variety of different ways to implement the method of this invention, and FIG. 1 is a block diagram of one generalized approach. In FIG. 1, a video signal present at a terminal 11 is coupled over parallel paths A and B to two terminals 12 and 13 of a switch 14. The A path directly connects the video signal to terminal 12 of switch 14, while path B includes a phase modulator 16 through which the video signal is coupled to terminal 13. The video out signal from switch 14 is present at a terminal 16.

The purpose of the switch 14 is to pass all of the video signal at terminal 11 through path A except for the color burst signal, and to switch the color burst signal through the path B so that the phase of the color burst signal is modulated by phase modulator 16. To this end, a color burst bracket pulse generator 17 is provided for controlling the switching of switch 14 between paths A and B. Many circuits are suitable for the color burst bracket pulse generator 17 and switch 14. All that is necessary is to predict the color burst portion of the video signal and switch the switch 14 to path B during the duration of the color burst signal.

In the embodiment of the invention shown in FIG. 1, the phase modulator 16 is driven by a random noise signal generator 18 coupled thereto through high pass filter 19. The random noise signal generator 18 generates any suitable analog (multivalued) noise signal for driving the phase modulator 16. Experiments performed on several different videotape recorders have indicated that the magnitude of the color burst modulation should be about 90 degrees peak-to-peak. Also, it is important that the mean phase deviation of the color burst signal over a period of about one millisecond is small, in order to prevent phase modulation of the subcarrier signal at the reference phase generated by a television receiver displaying the modified video signal. This is the purpose of the high pass filter.

Experiments which have been performed have also shown that it is not even necessary to use a multivalued noise signal and complicated phase modulator to achieve a sufficiently modified signal in accordance with the principles of this invention. It has been found to be sufficient to cause the color burst signal to randomly assume one of two phase angles equally displaced about its nominal value, for example +45° and −45° with respect to the nominal. Other phase angle deviations can, of course, be utilized. Though there are many different ways to implement an appropriate circuit arrangement, a presently preferred embodiment is illustrated in FIG. 2.

In fact, any suitable noise signal can be used to achieve the phase modulation, provided there are no frequency components sufficiently low enough to interfere with the receiver's subcarrier regenerator. Thus, random, psuedo-random, periodic signals and combinations thereof can be used, provided the above criteria are observed.

In FIG. 2 an incoming video signal at terminal 21 is applied directly to a terminal 22 of an electronic switch 20 and via a delay line 23 to a terminal 24 of the switch 20. In accordance with a preferred embodiment, the delay line 23 is designed to have an electrical length of about 70 nanoseconds, corresponding to about 90 degrees of subcarrier phase in the NTSC system. The output terminal 25 of electronic switch 20 is connected to an input terminal 27 of another electronic switch 26. Incoming video signals from terminal 21 are coupled through a delay line 28 to a terminal 29 of the electronic switch 26. The delay line 28 is constructed to have an electrical length equal to half that of delay line 23, which is 35 nanoseconds, corresponding to 45° of subcarrier phase in the NTSC system.

Electronic switch 26 is driven by a color burst bracket generator 31 which provides a suitably timed pulse corresponding to the color burst. Thus, the video signal at terminal 21 experiences a constant delay via delay line 28 of 35 nanoseconds except for about three microseconds following the horizontal sync pulse, i.e. during the color burst. During this period of time the video signal experiences a delay of either zero or 70 nanoseconds as determined by the state of electronic switch 20. Switch 20 is suitably driven by a square wave generator 32 operating at a frequency chosen for maximum annoyance value. A frequency of about 1 KHz has been found to be appropriate. The net result of these switching actions as described above is that the color burst signal is caused to phase deviate symmetrically about its mean phase in a suitably random manner.

What has been described above is a method and apparatus intended to modify a video signal so as to discourage or inhibit videotaping thereof. Specifically, in accordance with the present invention the video signal is modified in such a manner that a conventional television receiver produces a normal color picture from the modified signal, whereas a videotape recording made from the modified signal exhibits annoying color interference. The modification to the video signal is accomplished by deliberately phase modulating the color burst component of the video signal with a noise signal. Many different circuit arrangements are possible for achieving this phase modulation, and exemplary circuits have been disclosed. It should be clear that the present invention is not limited to the precise details of any of the circuits disclosed, and many modifications can be made by those skilled in this art without departing from the true spirit and scope of the invention.

What is claimed is:

1. A method for modifying a color video signal of the type wherein color information is transmitted on a subcarrier, the color video signal also including a color burst signal for generating in a television receiver a subcarrier signal at a reference phase for use in demodulating the color information, the method comprising the step of phase modulating the color burst signal with a noise signal to produce a modified color video signal, whereby the modified signal produces a normal color picture on a television receiver while a videotape recording made from the modified signal exhibits color interference.

2. A method in accordance with claim 1 including the step of high pass filtering the noise signal.

3. A method in accordance with claim 1 wherein said step of phase modulating the color burst signal is achieved with a random noise signal.

4. A method in accordance with claim 1 wherein said step of phase modulating the color burst signal is achieved with a pseudo-random noise signal.

5. A method in accordance with claim 1 wherein said step of phase modulating the color burst signal is achieved with a periodic noise signal.

6. A method in accordance with claim 1 wherein the color burst signal is modulated with a square wave signal.

7. A method in accordance with claim 6 wherein the square wave signal has a frequency of about 1 KHz.

8. Apparatus for modifying a color video signal of the type wherein color information is transmitted on a subcarrier, the color video signal also including a color burst signal for generating in a television receiver a subcarrier signal at a reference phase for use in demodulating the color information, comprising means coupling the video signal in parallel along two signals paths to an output terminal, switch means for selectively coupling one or the other of the signal paths to said output terminal, one of said signal paths including a phase modulator, a noise generator for driving said phase, modulator, means controlling said switch means to couple the color burst portion of the video signal to said output terminal through said signal path containing a phase modulator, and the other portions of the video signal through the other of said signal paths to said output terminal.

9. Apparatus in accordance with claim 8 wherein said noise generator is a random noise generator, and including a high pass filter interposed between said noise generator and phase modulator.

10. Apparatus for modifying a color video signal of the type wherein color information is transmitted on a subcarrier, the color video signal also including a color burst signal for generating in a television receiver a subcarrier signal at a reference phase for use in demodulating the color information, comprising an input video terminal and an output video terminal, a first switching means having an output connected to the output video terminal and having first and second inputs alternatively connectable to said output, a first signal path between said input video terminal and said first input of said first switch means, a second signal path between said input video terminal and said second input of said first switch means, means coupled to said input video terminal and said first switch means for coupling said second input of said first switch means to said output of said first switch means during color burst portions of the video signal and coupling the first input of said first switch means to said output during other portions of the video signal, said second signal path including means for phase modulating the color burst portions of the video signal.

11. Apparatus in accordance with claim 10 wherein said first signal path includes a delay line of X delay, said second signal path includes a second switching means having an output connected to said second input of said first switching means, said second switching means also having first and second inputs, said video input terminal connected directly to a first input of said second switching means and through a delay line of 2X delay to said second input thereof, and means for alternately coupling said second switching means first and second inputs to said output thereof, so as to phase modulate color burst portions of the video signal plus and minus X with respect to the phase of other portions of the video signal.

12. Apparatus in accordance with claim 11 including a square wave generator for alternatively coupling said second switching means first and second inputs to said output thereof.

13. Apparatus in accordance with claim 12 wherein said square wave generator has a frequency of about 1 KHz.

14. Apparatus in accordance with claim 13 wherein x delay is about 35 nanoseconds.

* * * * *